(12) United States Patent
Jeong et al.

(10) Patent No.: US 12,230,839 B2
(45) Date of Patent: Feb. 18, 2025

(54) APPARATUS AND METHOD OF MANUFACTURING BATTERY MODULE

(71) Applicant: LG ENERGY SOLUTION, LTD., Seoul (KR)

(72) Inventors: Woo Seung Jeong, Daejeon (KR); Hun Byung Park, Daejeon (KR); Seung Ryul Baek, Daejeon (KR); Jongkyun Oh, Daejeon (KR); Jaekwan Baek, Daejeon (KR); Yongseok Choi, Daejeon (KR); Yeongkyun Ko, Daejeon (KR); Siwon Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 614 days.

(21) Appl. No.: 17/613,248

(22) PCT Filed: Nov. 5, 2020

(86) PCT No.: PCT/KR2020/015425
§ 371 (c)(1),
(2) Date: Nov. 22, 2021

(87) PCT Pub. No.: WO2021/101137
PCT Pub. Date: May 27, 2021

(65) Prior Publication Data
US 2022/0223957 A1    Jul. 14, 2022

(30) Foreign Application Priority Data

Nov. 18, 2019   (KR) .......................... 10-2019-0148013

(51) Int. Cl.
*H01M 50/507*   (2021.01)
*H01M 10/04*    (2006.01)
(Continued)

(52) U.S. Cl.
CPC ..... *H01M 50/507* (2021.01); *H01M 10/0404* (2013.01); *H01M 50/209* (2021.01); *H01M 50/211* (2021.01)

(58) Field of Classification Search
CPC .................................................. H01M 10/0404
See application file for complete search history.

(56) References Cited

U.S. PATENT DOCUMENTS

2014/0295235 A1    10/2014   Jung
2019/0131596 A1    5/2019    Yang et al.
(Continued)

FOREIGN PATENT DOCUMENTS

CN    109075410 A    12/2018
CN    109478618 A    3/2019
(Continued)

OTHER PUBLICATIONS

Abstract of JP-09312169-A (Year: 1997).*
(Continued)

*Primary Examiner* — Gregg Cantelmo
(74) *Attorney, Agent, or Firm* — Birch, Stewart, Kolasch & Birch, LLP

(57) ABSTRACT

Discussed is an apparatus and a method for manufacturing a battery module, and the apparatus for manufacturing battery module includes a support member for supporting a module frame including a bottom part and two side surface parts facing each other, a side surface guide member configured to align the two side surface parts of the module frame, and a spreading jig located at an end of the side surface guide member and configured to spread opposite ends of the two side surface parts of the module frame, and a battery cell stack is inserted into an interior of the module frame by the spreading jigs.

10 Claims, 14 Drawing Sheets

(51) Int. Cl.
*H01M 50/209* (2021.01)
*H01M 50/211* (2021.01)

(56) References Cited

U.S. PATENT DOCUMENTS

| | | |
|---|---|---|
| 2019/0131598 A1 | 5/2019 | Hwang et al. |
| 2019/0181485 A1 | 6/2019 | Baeck et al. |
| 2019/0280265 A1 | 9/2019 | Jansen et al. |
| 2019/0319225 A1 | 10/2019 | Kang |
| 2019/0372079 A1 | 12/2019 | Nakamoto et al. |
| 2020/0106058 A1 | 4/2020 | Kim |

FOREIGN PATENT DOCUMENTS

| | | | |
|---|---|---|---|
| CN | 109606293 A | | 4/2019 |
| CN | 110226245 A | | 9/2019 |
| JP | 09312169 A | * | 12/1997 |
| JP | 2000203504 A | * | 7/2000 |
| JP | 2001057180 A | * | 2/2001 |
| JP | 2003-346902 A | | 12/2003 |
| JP | 2008-235144 A | | 10/2008 |
| JP | 2015-103295 A | | 6/2015 |
| JP | 2017027924 A | * | 2/2017 |
| KR | 2003-0086627 A | | 11/2003 |
| KR | 10-2014-0118734 A | | 10/2014 |
| KR | 10-2019-0063809 A | | 6/2019 |
| KR | 10-2019-0068973 A | | 6/2019 |
| KR | 10-2019-0087745 A | | 7/2019 |
| KR | 10-2019-0103433 A | | 9/2019 |
| WO | WO 2012/133711 A1 | | 4/2012 |
| WO | WO2018/022907 A1 | | 2/2018 |
| WO | WO2019/088625 A1 | | 5/2019 |
| WO | WO 2019/107734 A1 | | 6/2019 |

OTHER PUBLICATIONS

Abstract of JP-2001057180-A (Year: 2001).*
Abstract of JP-2017027924-A (Year: 2017).*
Abstract of JP-2000203504-A (Year: 2000).*
Extended European Search Report for European Application No. 20890892.1, dated Oct. 7, 2022.
International Search Report for PCT/KR2020/015425 mailed on Apr. 26, 2021.
European Search Report for European Application No. 20890892.1, dated Jun. 27, 2022.

* cited by examiner

[FIG. 1] (Related Art)
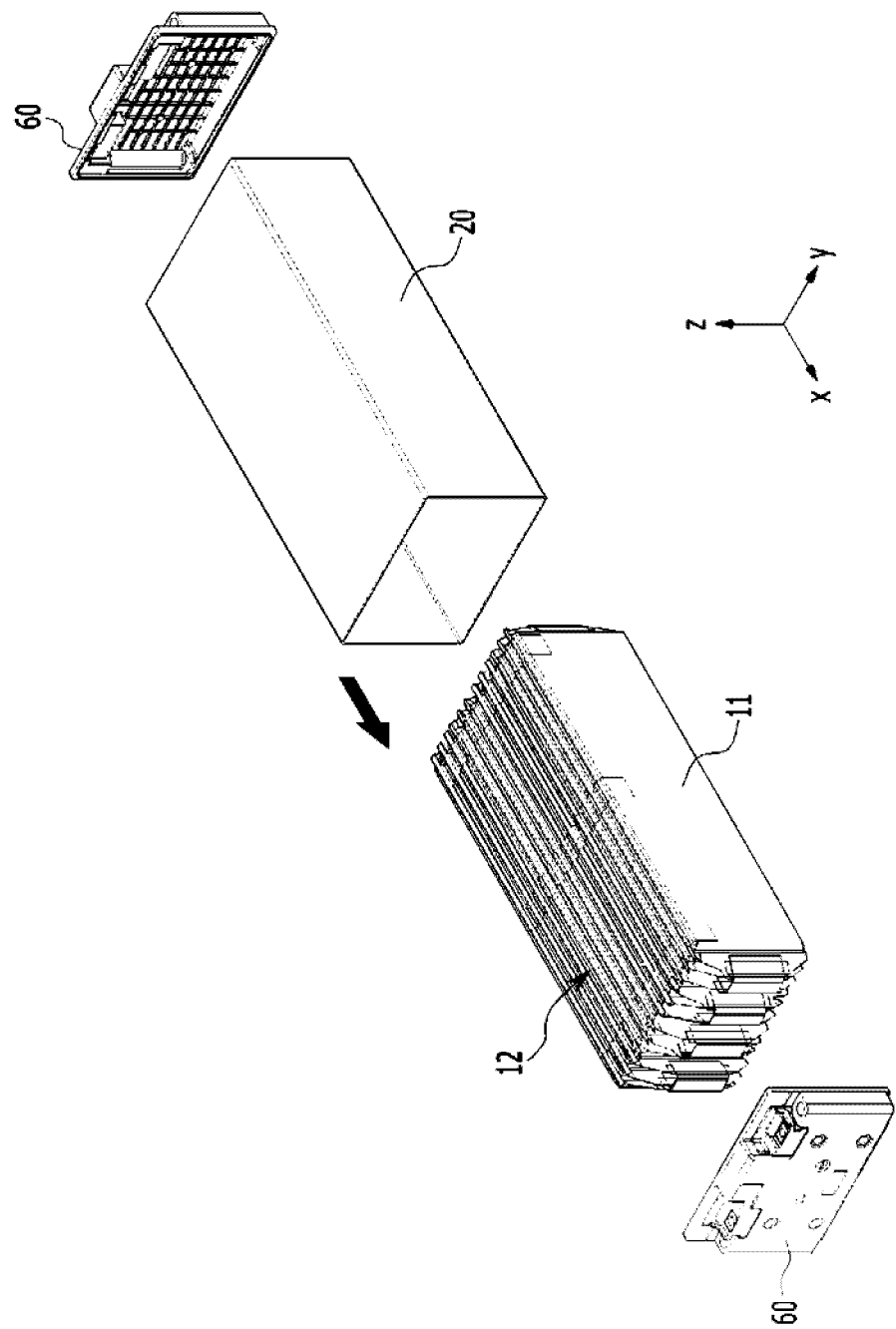

[FIG. 2]
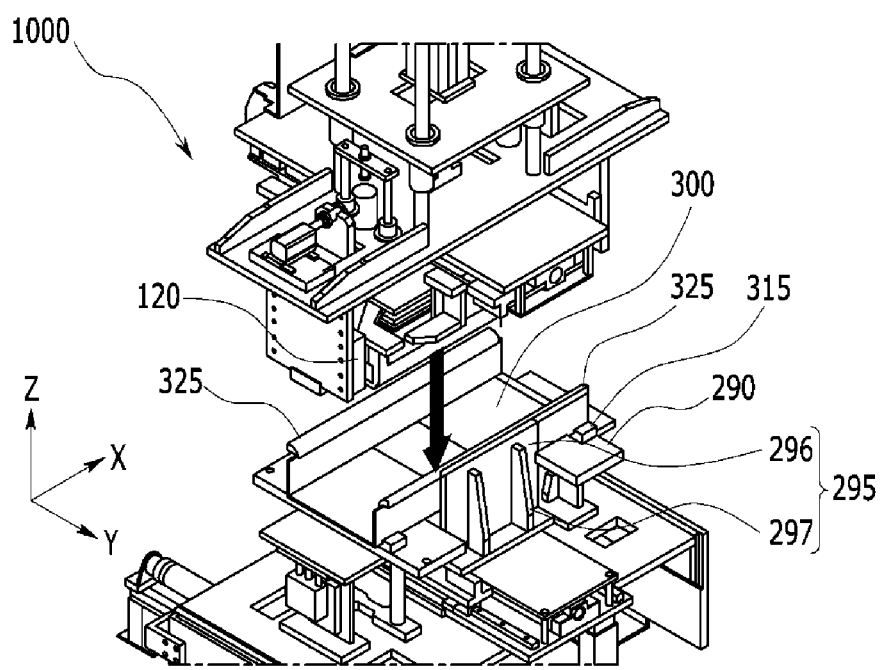

[FIG. 3]
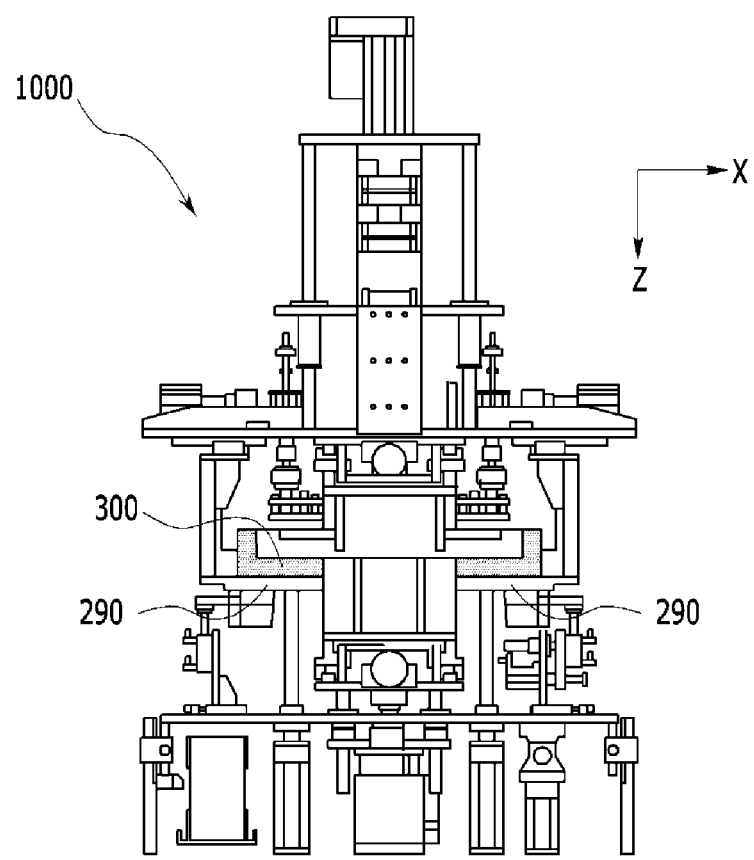

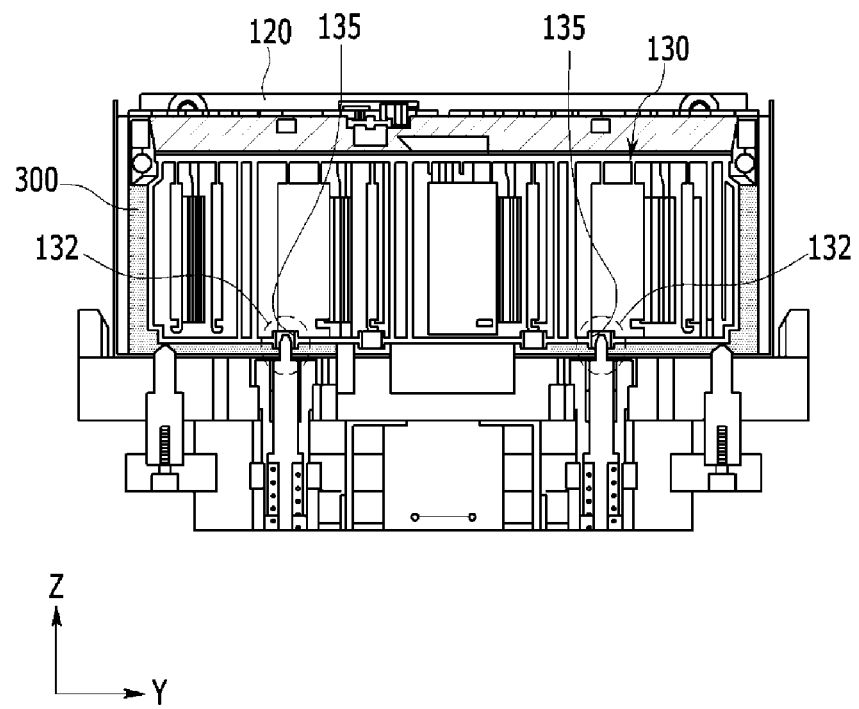
[FIG. 4]

[FIG. 5]
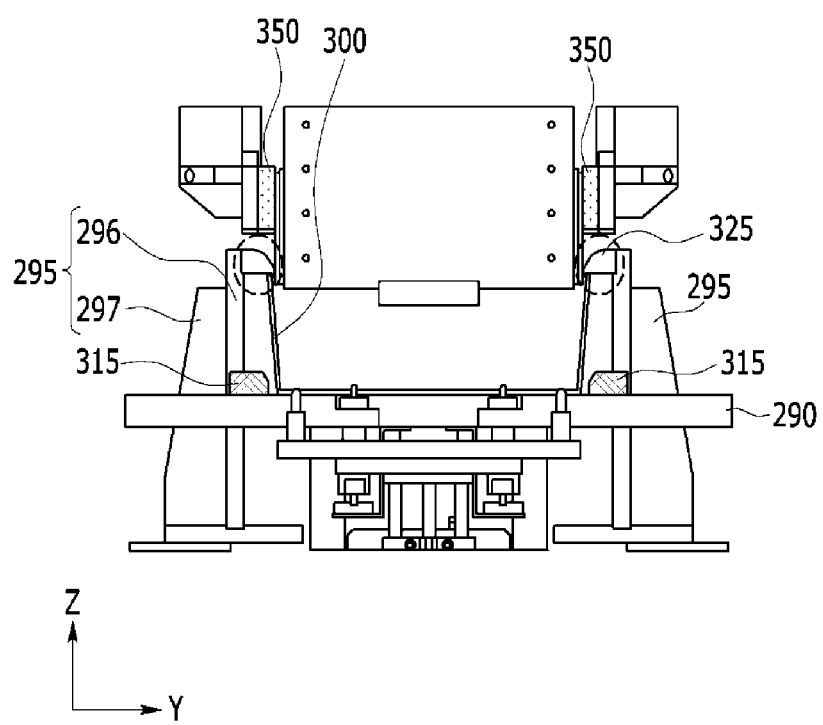

[FIG. 6]
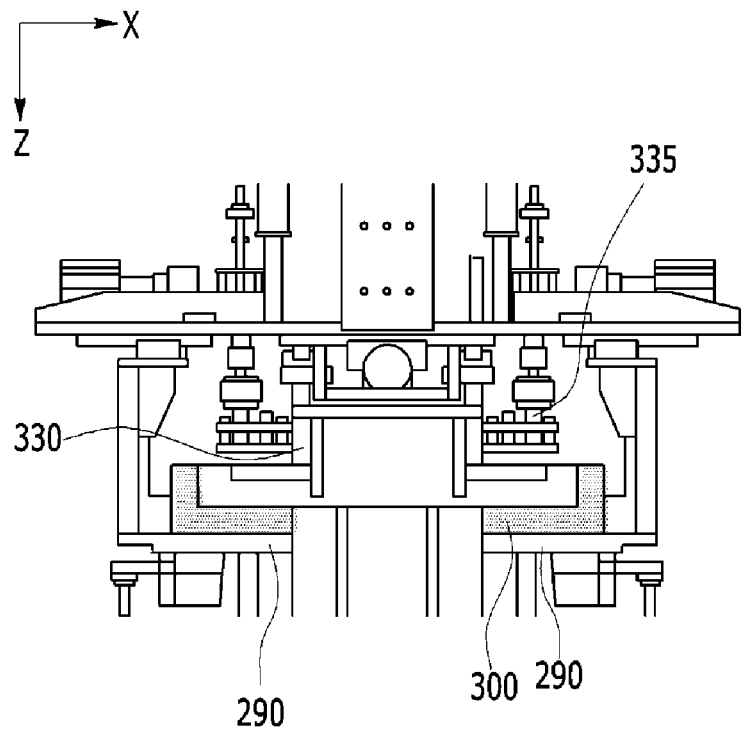
[FIG. 7]
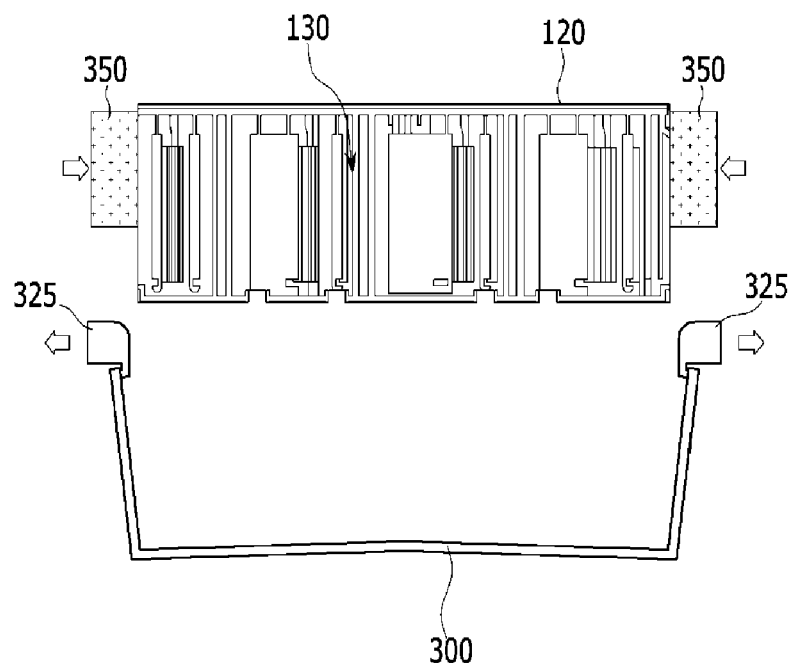

[FIG. 8]
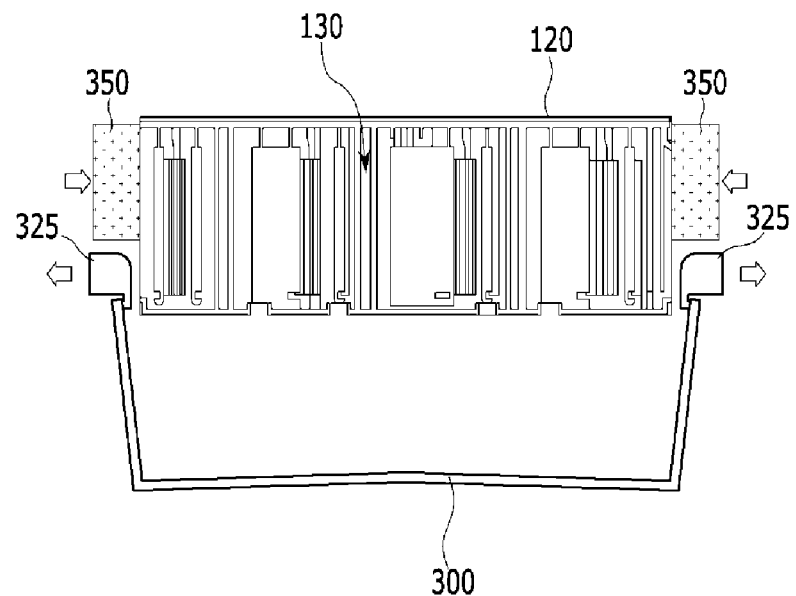
[FIG. 9]
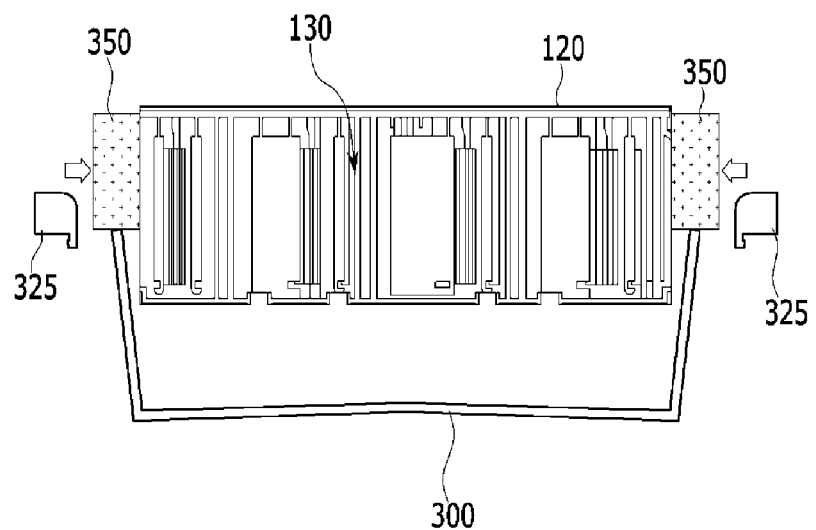

[FIG. 10]
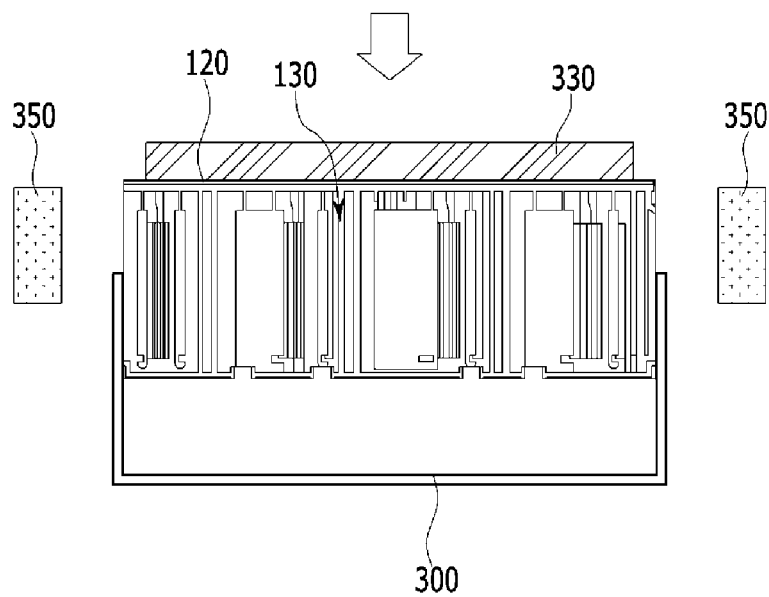

[FIG. 11]
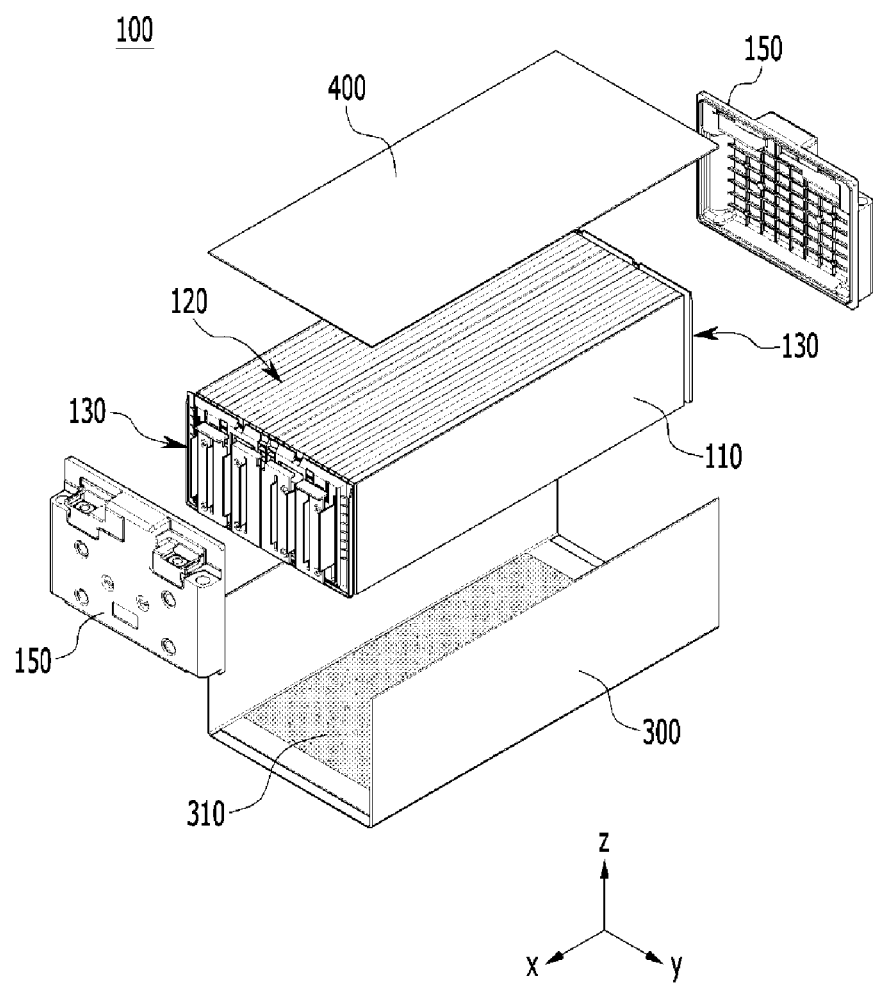

[FIG. 12]
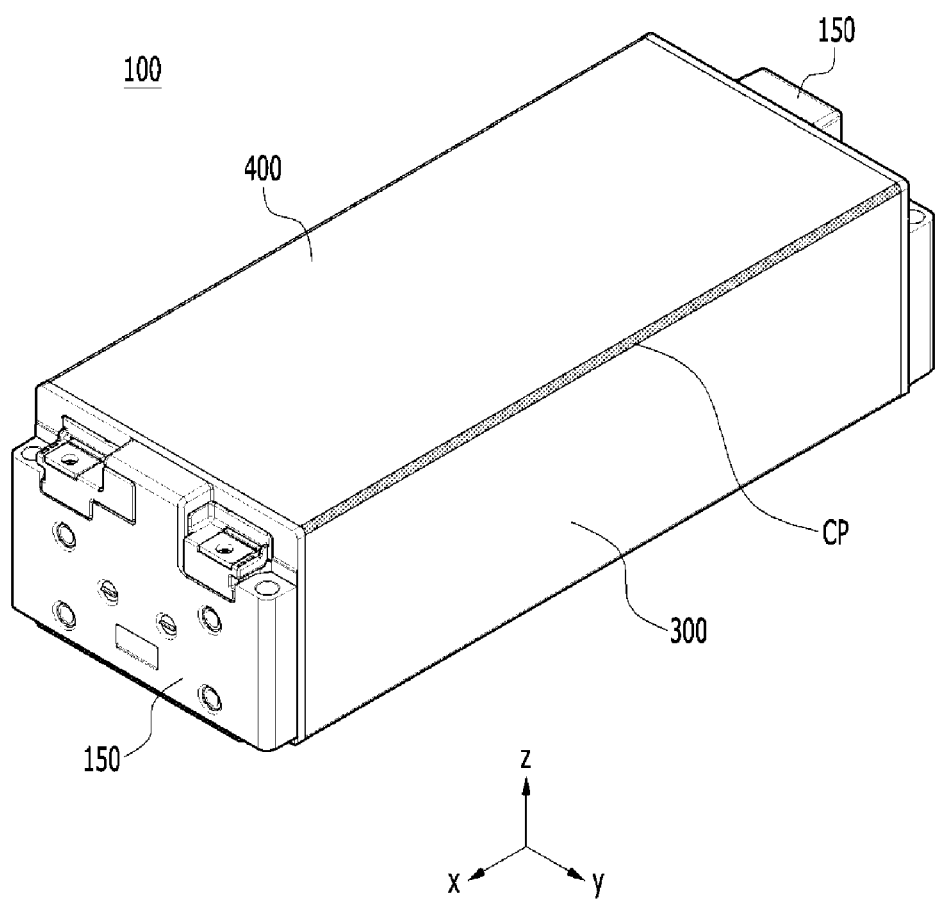

[FIG. 13]
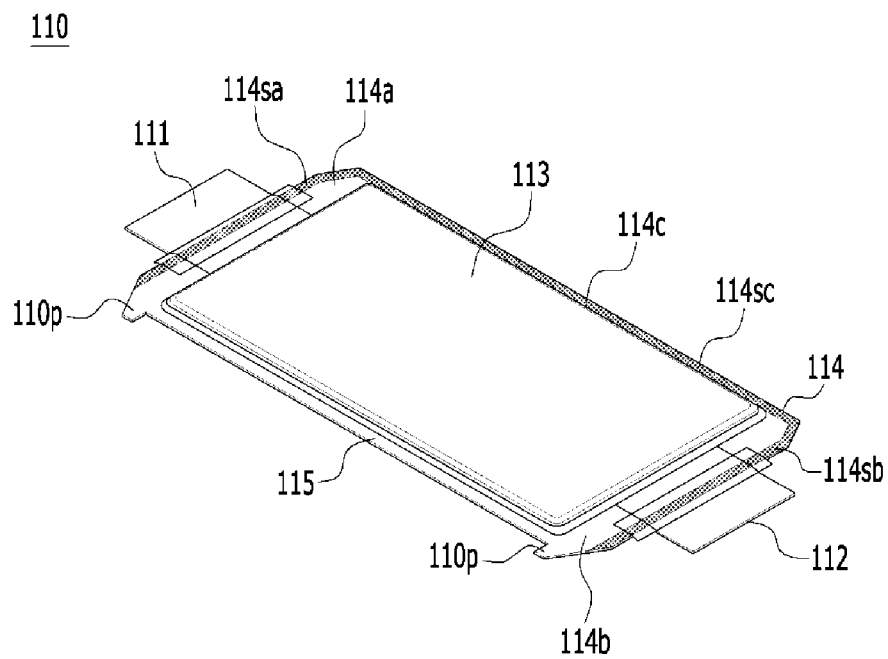

[FIG. 14]
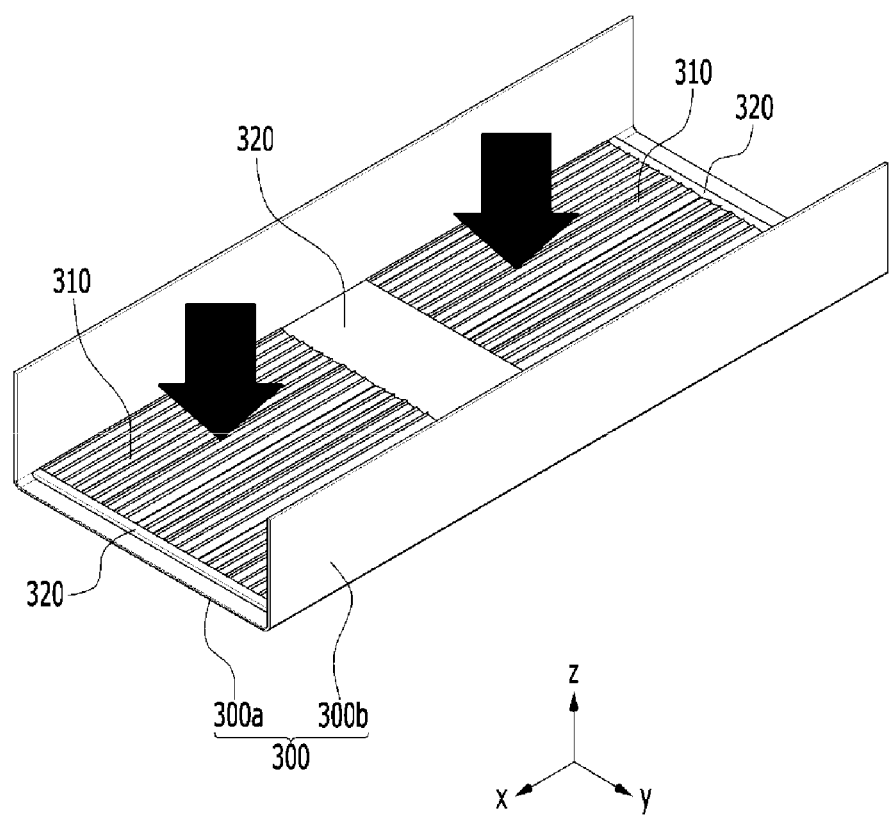

[FIG. 15]
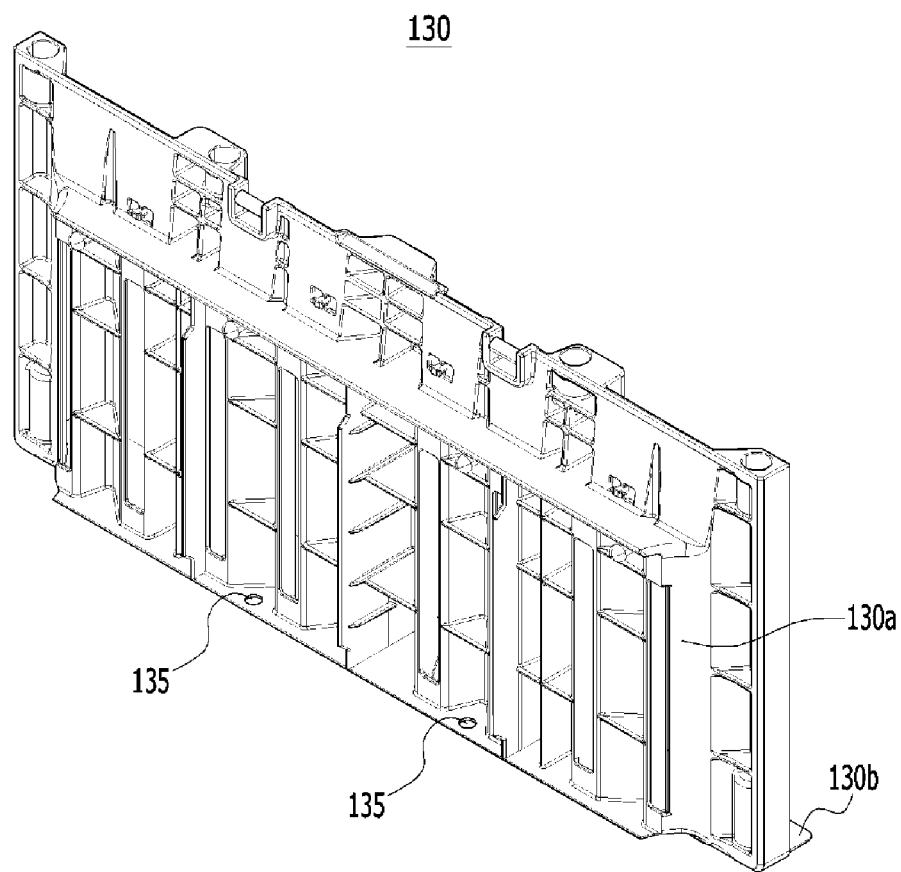

[FIG. 16]
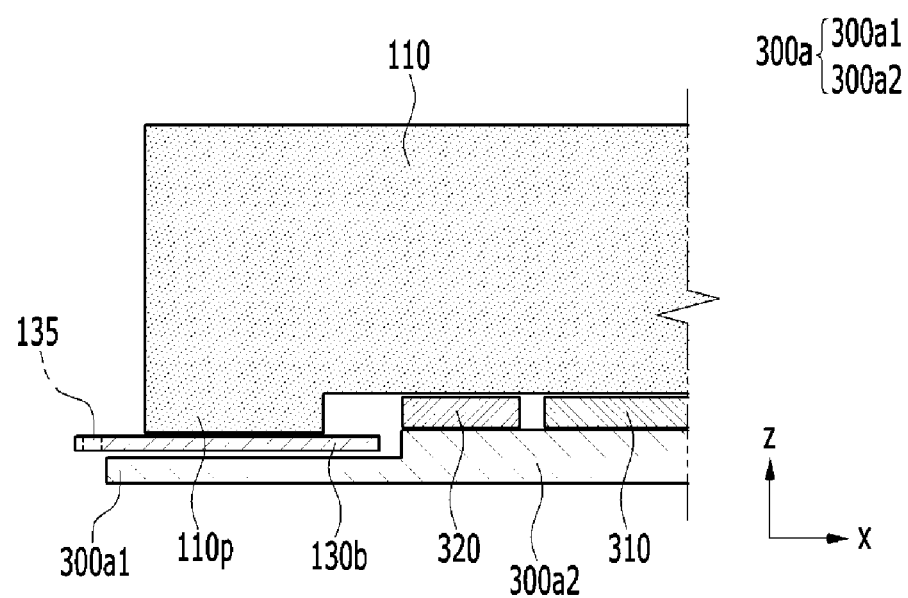

APPARATUS AND METHOD OF MANUFACTURING BATTERY MODULE

CROSS CITATION WITH RELATED APPLICATION(S)

This application claims the benefit of Korean Patent Application No. 10-2019-0148013 filed on Nov. 18, 2019 with the Korean Intellectual Property Office, the disclosure of which is incorporated herein by reference in its entirety.

TECHNICAL FIELD

The present disclosure relates to an apparatus and a method for manufacturing a battery module, and more particularly to an apparatus for manufacturing a battery module, which inserts a battery cell stack into a module frame, and a method for manufacturing the same.

BACKGROUND ART

Secondary batteries, which are easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is usually used as a battery cell of the middle or large-sized battery module. Meanwhile, in order to protect the cell stack from external impact, heat or vibration, the battery module may include a frame member of which a front surface and a rear surface are opened so as to house the battery cell stack in an internal space.

FIG. 1 is a perspective view illustrating a battery module having a mono frame according to the related art.

Referring to FIG. 1, the battery module may include a battery cell stack 12 configured to stack a plurality of the battery cells 11, a mono frame 20 of which a front surface and a rear surface are opened so as to cover the battery cell stack 12, and end plates 60 for covering the front surface and the rear surface of the mono frame 20. In order to form such a battery module, it is necessary to horizontally assemble the battery module such that the battery cell stack 12 is inserted into the opened front surface or rear surface of the mono frame 20 along the X-axis direction as illustrated by the arrow in FIG. 1. However, in order to stably perform such a horizontal assembly, a sufficient clearance has to be secured between the battery cell stack 12 and the mono frame 20. Here, the clearance refers to a gap generated by press-fitting and the like. When the tolerance is small, components may be damaged in a process of horizontally assembling the battery module. Accordingly, the height of the mono frame 20 has to be largely designed in consideration of the maximum height of the battery cell stack 12 and an assembly tolerance in the insertion process, and thus an unnecessarily wasted space may be caused. In order to minimize the assembly tolerance, a guide film may be used, but there is a problem that the guide film is cut off during the insertion process or costs due to replacement increase.

DETAILED DESCRIPTION OF THE INVENTION

Technical Problem

It is an object of the present disclosure to provide an apparatus for manufacturing a battery module, which improves the speed of inserting a battery cell stack into a module frame and reduces costs, and a method for manufacturing the battery module.

However, the problem to be solved by embodiments of the present disclosure is not limited to the above-described problems, and can be variously expanded within the scope of the technical idea included in the present disclosure.

Technical Solution

An apparatus for manufacturing a battery module according to one embodiment of the present disclosure includes a support member for supporting a module frame including a bottom part and two side surface parts facing each other, a side surface guide member configured to align the side surface part of the module frame, and a spreading jig located at the end of the side surface guide member and configured to spread both ends of the side surface parts of the module frame, and a battery cell stack is inserted into the interior of the module frame by the spreading jigs.

The apparatus for manufacturing a battery module may further include an auxiliary guide member located on the support member and configured to align the bottom part of the module frame.

The auxiliary guide member may be located on both sides that are adjacent to the side surface parts of the module frame, respectively.

The apparatus for manufacturing a battery module may further include at least one checking pin formed on the support member, and the checking pin may be inserted into a checking hole of a busbar frame connected to the battery cell stack.

The apparatus for manufacturing a battery module may further include an upper surface pressing jig configured to insert the battery cell stack into the interior of the module frame.

The upper surface pressing jig may include an elastic member configured to press an upper part of the battery cell stack.

The apparatus for manufacturing a battery module may further include a side surface pressing jig configured to press the side surface of the battery cell stack.

The side surface pressing jig may press the battery cell stack along a stacking direction of the battery cells included in the battery cell stack.

A method for manufacturing a battery module according to another embodiment of the present disclosure includes the steps of: mounting a battery cell stack on a bottom part of a module frame, of which an upper part is opened, mounting an upper plate such that the upper plate covers the battery cell stack on the opened upper part of module frame, coupling the upper plate and the module frame, and coupling end plates to opened both sides of the module frame, respectively, and the battery cell stack is mounted on the bottom part of the module frame by using spreading jigs configured to spread both ends of side surface parts of the module frame while being moved along a direction that is perpendicular to the bottom part of the module frame by side surface pressing jigs.

The step of mounting the battery cell stack on the bottom part of the module frame may include steps of, spreading both side surfaces of the opened upper part of the module frame by using the spreading jigs, inserting a lower end of the battery cell stack into the interior of the module frame in a state in which both side surfaces of the module frame are spread by the spreading jigs, and disassembling the spreading jigs from the module frame and mounting the battery cell stack on the module frame.

The step of mounting the battery cell stack on the module frame may further include pressing the battery cell stack by using upper surface pressing jig.

The upper surface pressing jig may include an elastic member configured to press an upper part of the battery cell stack.

The method for manufacturing the battery module may further include the step of connecting the battery cell stack and the busbar frame while moving the busbar frame toward an opposite direction to a direction in which electrode leads of battery cells included in the battery cell stack protrude before mounting the battery cell stack on the bottom part of the module frame.

The method for manufacturing a battery module may further include the step of applying a thermally conductive resin on the bottom part of the module frame before mounting the battery cell stack on the bottom part of the module frame.

The battery cell stack may be inserted into the bottom part of the module frame in a direction that is perpendicular to a stacking direction of a plurality of battery cells included in the battery cell stack.

The battery module according to another embodiment of the present disclosure includes a battery cell stack in which a plurality of battery cells are stacked, a module frame housing the battery cell stack and of which the upper part is opened, an upper plate for covering the battery cell stack on the upper side of the opened module frame, and a busbar frame connected to the battery cell stack, and the busbar frame includes a first busbar frame and a second busbar frame disposed respectively at both ends of a lengthwise direction of the battery cell stack, and a checking hole is formed at one or more of a lower end of the first busbar frame and a lower end of the second busbar frame.

The checking hole may be formed of a plurality of holes along a parallel direction to the busbar frame.

The module frame may include a bottom part and two side surface parts facing each other, and the bottom part may include a first part and a second part, and the first part is located on a peripheral side with respect to a lengthwise direction of the battery cell, and the second part is located on an inside of the first part, and the thickness of the first part may be smaller than the thickness of the second part.

The battery module may further include a pad part located between the second part and the battery cell stack.

Advantageous Effects

According to the embodiments of the present disclosure, the insertion speed can be improved by stacking the battery cell stack in a vertical direction, and the costs can be reduced by omitting the existing guide film.

Further, the battery cell stack can be stably mounted in the module frame by using a position-aligning member along each direction.

BRIEF DESCRIPTION OF THE DRAWINGS

FIG. 1 is a perspective view illustrating a battery module having a mono frame according to the related art;

FIG. 2 is a perspective view illustrating a battery module manufacturing apparatus according to an embodiment of the present disclosure;

FIG. 3 is a side view illustrating the battery module manufacturing apparatus according to an embodiment of the present disclosure;

FIG. 4 is a partial front view of the battery module manufacturing apparatus of FIG. 3;

FIG. 5 is a cross-sectional view illustrating along the Y-axis direction of the battery module manufacturing apparatus of FIG. 4;

FIG. 6 is a partially enlarged view the battery module manufacturing apparatus of FIG. 3;

FIGS. 7 to 10 are views illustrating a method of manufacturing a battery module according to another embodiment of the present disclosure;

FIG. 11 is an exploded perspective view illustrating a battery module according to another embodiment of the present disclosure;

FIG. 12 is a perspective view illustrating a state in which elements of the battery module of FIG. 11 are coupled to each other;

FIG. 13 is a perspective view illustrating one battery cell included in a battery cell stack of FIG. 11;

FIG. 14 is a perspective view illustrating a module frame in the battery module of FIG. 12;

FIG. 15 is a perspective view illustrating a busbar frame included in the battery module of FIG. 11; and FIG. 16 is a cross-sectional view taken along plane XZ in a lengthwise direction of a battery cell stack in FIG. 11.

DETAILED DESCRIPTION OF THE EMBODIMENTS

Hereinafter, various embodiments of the present disclosure will be described in detail with reference to the accompanying drawings so that those skilled in the art can easily implement them.

The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is a perspective view illustrating a battery module manufacturing apparatus according to an embodiment of the present disclosure. FIG. 3 is a side view illustrating the battery module manufacturing apparatus according to an embodiment of the present disclosure. FIG. 4 is a partial front view of the battery module manufacturing apparatus of FIG. 3. FIG. 5 is a cross-sectional view illustrating along the Y-axis direction of the battery module manufacturing apparatus of FIG. 4. FIG. 6 is a partially enlarged view of the battery module manufacturing apparatus of FIG. 3.

Referring to FIGS. 2 to 5, the battery module manufacturing apparatus 1000 according to an embodiment of the present disclosure includes a support member 290 for supporting a module frame 300, a side surface guide member 295 configured to align the side surface part of the module frame 300, and spreading jigs 325 located at the ends of the side surface guide members 295 and configured to spread both (or opposite) ends of the side surface parts of the module frame 300. The module frame 300 according to the present embodiment may have a U shape.

The side surface guide member 295 may include a plate 296 facing the side surface part of the module frame 300, and a support part 297 erecting in a wing shape in a direction that is perpendicular to the plate 296. The side surface guide member 295 according to the present embodiment can prevent a battery cell stack 120 mounted in the module frame 300 from moving in the Y-axis direction, thus securing the mounting position of the battery cell stack 120.

The spreading jig 325 can spread both ends of the side surface parts of the module frame 300 towards a direction that is far away from each other along the Y-axis direction such that the battery cell stack 120 is inserted into the interior of the module frame 300. The spreading jig 325 may be formed so as to extend along the X-axis direction as illustrated in FIG. 2. When the both ends of side surface parts of the module frame 300 are spread towards a direction that is far away from each other along the Y-axis direction by the spreading jig 325 having a structure extending long in the X-axis direction, spreading power may be uniformly transferred to the side surface part of the module frame 300. Accordingly, in the process of inserting the battery cell stack 120 into the module frame 300, the battery cell stack 120 can be more stably mounted on the bottom part of the module frame 300.

Referring to FIGS. 2 and 5, the battery module manufacturing apparatus 1000 according to the present embodiment may further include an auxiliary guide member 315 located on the support member 290 and configured to align the bottom part of the module frame 300. The auxiliary guide member 315 may support a border part in which the bottom part and the side surface parts of the module frame 300 meet each other. It is preferable that the auxiliary guide members 315 are located on both (or opposite) sides that are adjacent to the side surface parts of the module frame 300, respectively. In addition, the auxiliary guide members 315 may be formed at both ends of the side surface parts of the module frame 300.

As illustrated in FIG. 5, the battery module manufacturing apparatus 1000 according to the present embodiment may further include side surface pressing jigs 350 configured to press the side surfaces of the battery cell stack 120. The side surface pressing jigs 350 may allow the battery cell stack 120 to be stably moved and to be located at the upper part of the module frame 300 in a process of preparing for a step of mounting the battery cell stack 120 in the interior of the module frame 300. The side surface pressing jigs 350 may press the battery cell stack 120 along the stacking direction of the battery cells included in the battery cell stack 120.

Referring to FIG. 4, the battery module manufacturing apparatus 1000 according to the present embodiment may further include at least one checking pin 132 formed on the support member 290. The checking pin 132 may be inserted into a checking hole 135 of the busbar frame 130 connected to the battery cell stack 120. According to the present disclosure, because the checking pin 132 has a structure of being inserted into the checking hole 135, a battery cell stack 120 mounted in the module frame 300 can be prevented from moving in the X-axis direction and/or Y-axis direction, thereby securing a mounted position.

Referring to FIGS. 3 and 6, the battery module manufacturing apparatus 1000 according to the present embodiment may further include an upper surface pressing jig 330 configured to insert the battery cell stack into the interior of the module frame 300. The upper surface pressing jig 330 may include an elastic member 335 and the elastic member 335 may have a structure including a spring. According to the present embodiment, the battery cell stack may be prevented from protruding in a direction that is opposite to a direction in which the battery cell stack is inserted due to a repulsive force of the elastic member 335 included in the upper surface pressing jig 330. Further, the upper surface pressing member may absorb a clearance of the battery cell stack to allow the battery cell stack to be inserted. Here, a width of the battery cell stack may mean a thickness of the battery cell stack in the Z-axis direction.

In the following, an example of manufacturing a battery module will be described by using the above-mentioned battery module manufacturing apparatus with reference to FIGS. 7 to 10.

FIGS. 7 to 10 are views illustrating a method for manufacturing a battery module according to another embodiment of the present disclosure.

The method for manufacturing a battery module according to the present embodiment includes a step of mounting a battery cell stack on a bottom part of a module frame, of which an upper part is opened, a step of mounting an upper plate such that the upper plate covers the battery cell stack on the opened upper part of module frame, a step of coupling the upper plate and the module frame, and a step of coupling end plates to both the opened sides of the module frame, respectively.

Referring to FIGS. 7 to 10, the battery cell stack 120 is moved along a direction that is perpendicular to the bottom part of module frame 300 in the step of mounting the battery cell stack on the bottom part of the module frame, of which the upper part is opened. Here, the battery cell stack 120 may be mounted on the bottom part of the module frame 300 by using spreading jigs 325 configured to spread both ends of side surface parts of the module frame 300.

In detail, as illustrated in FIG. 7, the step of mounting the battery cell stack 120 on the bottom part of the module frame 300 may include a step of spreading both side surfaces of the opened upper part of the module frame 300 by using the spreading jigs 325, a step of inserting a lower end of the battery cell stack 120 into the interior of the module frame 300 in a state in which the both side surfaces of the module frame 300 are spread by the spreading jigs 325, as illustrated in FIG. 8, a step of disassembling the spreading jigs 325 from the module frame 300 and mounting the battery cell stack 120 on the module frame 300, as illustrated in FIG. 9.

Referring to FIG. 10, the step of mounting the battery cell stack 120 on the module frame 300 may further include a step of pressing the battery cell stack 120 by using an upper surface pressing jig 330. Side surface pressing jigs 350 that are pressing the battery cell stack 120 before pressing the battery cell stack 120 by the upper surface pressing jig 330 may be disassembled from the battery cell stack 120. As mentioned above, although not illustrated in FIG. 10, the upper surface pressing jig 330 may include an elastic member configured to press the battery cell stack 120. At least one end of the battery cell stack 120 mounted on the module frame 300 is connected to a busbar frame 130, and as illustrated in FIG. 4, checking holes 135 formed at lower ends of the busbar frame 130 may be mounted on checking pins included in the apparatus for manufacturing the battery module. Here, the busbar frame 130 may be protruded from opened front and rear surfaces of the module frame 300 to couple the checking pins 132 and the checking holes 135.

Hereinafter, the battery module according to another embodiment of the present disclosure will be described with reference to FIGS. 11 to 16.

FIG. 11 is an exploded perspective view illustrating a battery module according to another embodiment of the present disclosure. FIG. 12 is a perspective view illustrating a state in which elements of the battery module of FIG. 11 are coupled to each other. FIG. 13 is a perspective view illustrating one battery cell included in a battery cell stack of FIG. 11.

Referring to FIGS. 11 and 12, a battery module 100 according to the present embodiment includes a battery cell stack 120 including a plurality of battery cells 110, a module frame 300, of which an upper surface, a front surface, and a rear surface are opened, an upper plate 400 for covering an upper part of the battery cell stack 120, end plates 150 located on a front surface and a rear surface of the battery cell stack 120, respectively, and busbar frames 130 located between the battery cell stack 120 and the end plates 150.

When it is assumed that both opened sides of the module frame 300 are a first side and a second side, respectively, the module frame 300 has a plate-shaped structure bent so as to continuously cover the front surface, the lower surface and the rear surface, which are adjacent to each other, of the remaining outer surfaces excluding surfaces of the battery cell stack 120 corresponding to the first side and the second side. The upper surface of the module frame 300, which corresponds to the lower surface thereof, is opened.

The upper plate 400 has a plate-shaped structure surrounding the remaining upper surface excluding the front surface, the lower surface, and the rear surface, which are surrounded by the module frame 300. The module frame 300 and the upper plate 400 are coupled to each other through welding and the like in a state in which corresponding edge parts thereof contact each other to form a structure covering the battery cell stack 120. That is, a coupling part CP may be formed at the corresponding edge parts of the module frame 300 and the upper plate 400 through a coupling method such as welding or the like.

The battery cell stack 120 includes a plurality of battery cells 110 stacked in one direction thereof, and the plurality of the battery cells 110 may be stacked in the Y-axis direction as illustrated in FIG. 11. It is preferable that the battery cells 110 is pouch type battery cells. For example, referring to FIG. 13, the battery cell 110 according to the present embodiment has a structure in which two opposite electrode leads 111 and 112 are protruded from one end part 114a and another one end part 114b of a battery body 113, respectively while being opposite to each other. The battery cell 110 may be manufactured by joining both end parts 114a and 114b of a battery case and both side surfaces 114c connecting them while a battery assembly (not illustrated) is housed in the battery case 114. That is, the battery cell 110 according to the present embodiment includes a total of three places of sealing parts 114sa, 114sb, and 114sc, the sealing parts 114sa, 114sb, and 114sc are sealed in a method such as thermal fusion, and another remaining side part may have a connector 115. A section between both end parts 114a and 114b of the battery case 114 may be defined as a lengthwise direction of the battery cell 110, and a section between one side part 114c and the connector 115 connecting both end parts of the battery case 114 may be defined as a widthwise direction of the battery cell 110.

The connector 115 is an area extending along one periphery of the battery cell 110, and a protrusion 110p of the battery cell 110 may be formed at the end of the connector 115. The protrusion 110p may be formed at one or more of both ends of the connector 115, and may protrude in a direction that is perpendicular to a direction in which the connector 115 extends. The protrusion 110p may be located between one of sealing parts 114sa and 114sb of both end parts 114a and 114b of the battery case 114, and the connector 115.

The battery case 114 is generally formed of a laminate structure of a resin layer/a metal thin film layer/a resin layer. For example, when a surface of the battery case formed of an oriented (O) nylon layer, a surface of the battery case tends to easily slip due to an external impact at the time of stacking a plurality of battery cells to form a middle or large-sized battery module. Accordingly, in order to prevent this and maintain a stable stacked structure of the battery cells, an adhesive member such as a viscous adhesive of a double sided paper or a chemical adhesive coupled due to a chemical reaction can be attached to a surface of the battery case, thereby forming the battery cell stack 120. In the present embodiment, the battery cell stack 120 is stacked in the Y-axis direction, and is housed in the interior of the module frame 300 in the Z-axis direction, so that the battery cell stack 120 may be cooled by a thermally conductive resin layer which will be described below. In a comparative example, the battery cell is formed of cartridge type components, so that the fixing between the battery cells may be made by assembling a frame of the battery module. In the comparative example, a cooling operation does not almost occur or may progress in a surface direction of the battery cell due to existence of the cartridge type components and may not progress in a height direction of the battery module.

FIG. 14 is a perspective view illustrating a module frame in the battery module of FIG. 12.

Referring to FIG. 14, the module frame 300 according to the present embodiment includes a bottom part 300a and two side surface parts 300b facing each other. Before the battery cell stack 120 described in FIG. 11 is mounted on the bottom part 300a of the module frame 300, the thermally conductive resin layer 310 can be formed by applying a thermally conductive resin onto the bottom part 300a of the module frame 300 and curing the thermally conductive resin.

Before the thermally conductive resin layer 310 is formed, that is, before the applied thermally conductive resin is cured, the battery cell stack 120 may be mounted on the bottom part 300a of the module frame 300 while moving along in a direction that is perpendicular to the bottom part 300a of the module frame 300. Thereafter, the thermally conductive resin layer 310 that is formed by the curing of the thermally conductive resin is located between the bottom part 300a of the module frame 300 and the battery cell stack 120. The thermally conductive resin layer 310 can function to transfer heat generated from the battery cells 110 to a bottom of the battery module 100, and fix the battery cell stack 120.

The battery module according to the present embodiment may further include a pad part 320 formed on the bottom part 300a of the module frame 300. The pad part 320 may guide an application location of the thermally conductive resin or prevent the thermally conductive resin from overflowing to the outside of the bottom part 300a, and at least one pad part may be formed. FIG. 14 illustrates that one pad part is formed in the center of the bottom part 300a, and pad parts 320 are formed respectively at both ends of the bottom part 300a with respect to the X-axis direction, but the size, the location, the number, and the like of pad parts 320 may be modified and designed in consideration of an application amount or the like of the thermally conductive resin. The pad part 320 may be formed of an insulation film. At this time, the pad part 320 may be formed of a material such as polyurethane (PU) foam or rubber such that the battery cell 110 makes contacts with an upper part of the bottom part 300a and thus the thermally conductive resin can be compressed.

Referring to FIGS. 11 and 12 again, widths of the side surface part 300b and the upper plate 400 of the module frame 300 according to the present embodiment may be identical to each other. That is, an edge portion of the upper plate 400 along the X-axis direction and an edge portion of the side surface part 300b of the module frame 300 along the X-axis direction may make direct contact with each other to be coupled to each other through a method such as welding and the like.

FIG. 15 is a perspective view illustrating a busbar frame in the battery module of FIG. 11.

Referring to FIG. 15, the busbar frame 130 according to the present embodiment includes a main frame 130a disposed to be perpendicular to a direction in which the electrode leads 111 and 112 described in FIG. 13 protrude, and a bending part 130b extending from a lower part of the main frame 130a. According to the present embodiment, the checking holes 135 are formed in the bottom part of the busbar frame 130. In the above-mentioned process of manufacturing the battery module, the checking holes 135 are coupled to the checking pins 132 illustrated in FIG. 4 when the battery cell stack 120 is mounted on the module frame 300, and subsequently, the checking holes 135 are continuously left in the battery module manufactured by an additional process.

The busbar frame 130 is connected to the battery cell stack 120 as described in FIGS. 11 and 12. A structure in which the electrode leads pass through slots and couple to the busbars may be formed in the main frame 130a. The bending part 130b may be bent by approximately 90 degrees with respect to the main frame 130a to be located on the bottom part 300a of the module frame 300. The bending part 130b and peripheral configurations will be additionally described with reference to FIG. 16.

FIG. 16 is a cross-sectional view taken along plane XZ in a lengthwise direction of a battery cell stack in FIG. 11.

Referring to FIG. 16, the battery cell 110 according to the present embodiment may include a protrusion 110p formed in a widthwise direction thereof and the protrusion 110p may be located on the bending part 130b. Here, a widthwise direction of the battery cell 110 may be a Z-axis direction of FIG. 16. The bottom part 300a of the module frame according to the present embodiment includes a first part 300a1 and a second part 300a2, the first part 300a1 is located at a periphery thereof with respect to a lengthwise direction of the battery cell 110, and the second part 300a2 is located inside the first part 300a1. At this time, it is preferable that the thickness of the first part 300a1 is smaller than the thickness of the second part 300a2. Here, a lengthwise direction of the battery cell 110 may be an X-axis direction of FIG. 16.

Referring to FIGS. 15 and 16, the bending part 130b of the busbar frame 130 in the present embodiment is located on the first part 300a1 of the bottom part 300a of the module frame. Here, it is preferable that the total thickness of the thickness of the bending part 130b and the thickness of the first part 300a1 is smaller than the thickness of the second part 300a2. This is because the protrusion 110p of the battery cell 110 is caught by the level difference of the first part 300a1 and the second part 300a2 to be prevented from moving due to an external impact. In addition, a gap between the battery cell 110 and a frame may be reduced through machining of the bottom part 300a of the module frame, and such a gap reducing effect can cause the gap reducing effect obtained by assembling the battery module in a height direction together with a synergy effect, thereby maximizing overall space efficiency. Due to the machining of the bottom part 300a of the module frame, a level difference of the bottom part 300a can also be simultaneously formed while forming a module frame structure. The pressing, numerical control work (NC) processing, or the like may be used for forming the step.

The pad part 320 is located between the second part 300a2 of the bottom part 300a and the battery cell 110, and the thermally conductive resin layer 310 is located on an inside of the pad part 320. That is, the pad part 320 may be located between the thermally conductive resin layer 310 and the first part 300a1 of the bottom part 300a to define a location at which the thermally conductive resin layer 310 is formed.

In the present embodiment, the busbar frame 130 may be protruded from the bottom part 300a of the module frame 300. That is, as mentioned above, the structure may secure a space such that the checking holes 135 are coupled to the checking pins 132 in FIG. 4 in the process of manufacturing the battery module. The X-axis direction of FIG. 16 coincides with a direction protruding from the opened front and rear surfaces of the module frame 300, and the busbar frame 130 may be protruded from the opened front and rear surfaces of the module frame 300 to couple the checking pins 132 and the checking holes 135.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

120: battery cell stack
130: busbar frame

290: support member
295: side surface guide member
315: auxiliary guide member
325: spreading jig
330: upper surface pressing jig

The invention claimed is:

1. An apparatus for manufacturing a battery module, the apparatus comprising:
   a support member configured to support a module frame, the module frame comprising a bottom part and two side surface parts facing each other;
   a side surface guide member configured to align the two side surface parts of the module frame; and
   a spreading jig located at an end of the side surface guide member and configured to spread opposite ends of the two side surface parts of the module frame; and
   auxiliary guide members located on the support member and configured to align the bottom part of the module frame,
   wherein a battery cell stack is inserted into an interior of the module frame by the spreading jigs.

2. The apparatus of claim 1, wherein the auxiliary guide members are located respectively on opposite sides thereof that are adjacent to the two side surface parts of the module frame.

3. The apparatus of claim 1, further comprising at least one checking pin formed on the support member,
   wherein the at least one checking pin is inserted into a checking hole of a busbar frame connected to the battery cell stack.

4. The apparatus of claim 3, further comprising an upper surface pressing jig configured to insert the battery cell stack into the interior of the module frame.

5. The apparatus of claim 4, wherein the upper surface pressing jig comprises an elastic member configured to press an upper part of the battery cell stack.

6. The apparatus of claim 1, further comprising side surface pressing jigs configured to press the side surface parts of the battery cell stack, respectively.

7. The apparatus of claim 6, wherein each side surface pressing jig presses the battery cell stack along a stacking direction of the battery cells included in the battery cell stack.

8. An apparatus for manufacturing a battery module, the apparatus comprising:
   a support member configured to support a module frame, the module frame comprising a bottom part and two side surface parts facing each other;
   a side surface guide member configured to align the two side surface parts of the module frame;
   a spreading jig located at an end of the side surface guide member and configured to spread opposite ends of the two side surface parts of the module frame;
   at least one checking pin formed on the support member,
   wherein the at least one checking pin is inserted into a checking hole of a busbar frame connected to the battery cell stack, and
   wherein a battery cell stack is inserted into an interior of the module frame by the spreading jigs.

9. The apparatus of claim 8, further comprising an upper surface pressing jig configured to insert the battery cell stack into the interior of the module frame.

10. The apparatus of claim 9, wherein the upper surface pressing jig comprises an elastic member configured to press an upper part of the battery cell stack.

* * * * *